United States Patent [19]

Yamada

[11] Patent Number: 5,422,987
[45] Date of Patent: Jun. 6, 1995

[54] METHOD AND APPARATUS FOR CHANGING THE PERSPECTIVE VIEW OF A THREE-DIMENSIONAL OBJECT IMAGE DISPLAYED ON A DISPLAY SCREEN

[75] Inventor: Yoichi Yamada, Kawasaki, Japan

[73] Assignee: Fujitsu Limited, Kawasaki, Japan

[21] Appl. No.: 932,244

[22] Filed: Aug. 19, 1992

[30] Foreign Application Priority Data

Aug. 20, 1991 [JP] Japan ............... 3-208297

[51] Int. Cl.⁶ ............... G06T 15/20; G06F 3/00
[52] U.S. Cl. ............... 395/127; 395/161; 395/137; 345/163
[58] Field of Search ............... 395/119, 127, 137, 138, 395/155, 161; 345/163, 157, 167, 125, 126

[56] References Cited

U.S. PATENT DOCUMENTS

| | | | |
|---|---|---|---|
| 4,734,690 | 3/1988 | Waller | 395/127 |
| 4,754,269 | 6/1988 | Kishi et al. | 395/127 |
| 4,845,643 | 7/1989 | Clapp | 395/127 |
| 5,019,809 | 5/1991 | Chen | 345/157 X |
| 5,124,693 | 6/1992 | Himelstein et al. | 395/127 X |
| 5,276,785 | 1/1994 | Mackinlay et al. | 395/127 |
| 5,303,337 | 4/1994 | Ishida | 395/119 |
| 5,325,472 | 6/1994 | Horiuchi et al. | 395/127 |
| 5,359,703 | 10/1994 | Robertson et al. | 395/119 |

*Primary Examiner*—Raymond J. Bayerl
*Attorney, Agent, or Firm*—Staas & Halsey

[57] ABSTRACT

An apparatus and method for rotating a perspective view of a three-dimensional object image displayed on a display screen from an original view point to a desired view point, and for moving the perspective view in a parallel manner from the original view point to the desired view point. When the perspective view is rotated, a circle is generated that has a first point corresponding to the desired view point. A line segment is generated from the first point to the center of the circle. A hemisphere is generated that has a top surface, a vertex, and the circle as a bottom surface. A second point on the top surface represents the first point projected to the top surface. The desired view point is a projection from the second point to the bottom surface of the hemisphere and the original view point is a projection from the vertex of the hemisphere. The perspective view displayed on the display screen is then changed to the desired view point. When the perspective view is moved in a parallel manner, a boundary is generated which represents a displayable range of the three-dimensional object image on the display screen. A line segment is generated from the current cursor position to the center of the boundary. The displayed perspective view is changed by moving the perspective view along the line segment by a distance equal to the length of the line segment.

23 Claims, 8 Drawing Sheets ent invention is to provide a three-dimensional object
METHOD AND APPARATUS FOR CHANGING THE PERSPECTIVE VIEW OF A THREE-DIMENSIONAL OBJECT IMAGE DISPLAYED ON A DISPLAY SCREEN

BACKGROUND OF THE INVENTION

1. Field of the Invention

The present invention relates to a three-dimensional object image drawing apparatus and a three-dimensional object image drawing method for drawing a three-dimensional object image on a display screen, and more particularly to a three-dimensional object image drawing apparatus and method for rotating or moving along a line a three-dimensional object image displayed on a screen.

In recent years, CAD systems using Engineering Work Station (EWS) have been developed and have been used in various design work. In such a CAD system, means for communicating between a person and a system, namely, a man-machine interface, is regarded as important for handling images. Therefore, a man-machine interface that provides easier operation is desired.

To this end, instead of a conventional keyboard, a pointing device such as, for example, a mouse has been developed as a means for effecting communication with a system. By using the pointing device, figures can be easily drawn or edited.

In such a CAD system, frequently there are cases in which an image of a three-dimensional object having a size larger than the size of the screen in the system must be displayed. In this case, the image is displayed by scaling down the figure or by partially displaying the figure. For example, when the whole figure is to be seen, the display is scaled down, and when a part of the image is to be displayed, a part of the image of the three-dimensional object is selected and displayed.

In addition, in a CAD system, it is necessary for design purposes to display a three-dimensional object when it is viewed from an arbitrary direction.

In a conventional CAD system, to partially display a desired three-dimensional object image, a displayed figure is modified by moving it along a line in such a way as to designate and instruct, by means of a pointing device such as a mouse, for example, a predetermined point on the three-dimensional object image, currently being displayed. The designated point is moved to the center of the screen, resulting in a partial display of the three-dimensional object image. This movement of an image is hereinafter referred to as a parallel movement. To designate and instruct as above is referred to as "pan hit".

Also, to rotate a three-dimensional object image by changing the view direction, it is necessary to know the angle of rotation with respect to each axis and to designate the desired angle of rotation with respect to the axis.

When a parallel movement is to be effected by the conventional CAD system, however, the three-dimensional object image is moved along a line and displayed only in such a way that the pan hit point, i.e., the designated and instructed point, is moved to the center of the screen. Therefore, when a predetermined range of the figure is to be displayed, an operator cannot easily recognize the pan hitting position, i.e., the designating and instructing position, to display the desired range so that, in order to display the desired figure on the screen, pan hittings, i.e., designations and instructions, must be repeated many times. Further, by repeating the pan hits, if the operator misses the current position, the picture image must be compressed one time and a cursor must be moved to a desired position, and then the image must be enlarged again to pan hit it. Therefore, in the conventional CAD system, there is a problem in that to display a desired image by means of a parallel movement is very complex and inefficient.

Also, in the conventional CAD system, when a three-dimensional object is to be rotated by changing the direction of view or view direction, there are problems in that an operator must recognize and designate the angle of rotation with respect to each axis in accordance with the change of the view direction, making the operation complex. Moreover, the image when viewed from the desired view direction cannot always be displayed at one time but may require many separate operations.

SUMMARY OF THE INVENTION

In view of the above problems, an object of the present invention is to provide a three-dimensional object drawing apparatus and method by which, by a simple operation, an operator can pan hit as desired to display a three-dimensional object image in a parallel movement or rotation, and in addition, in the case of rotation of the displayed image, the view direction can be designated intuitionally to display the three-dimensional object image viewed from that direction.

To attain the above object, there is provided, according to the present invention, a three-dimensional object drawing apparatus for rotating a perspective view of a three-dimensional object image displayed on a two-dimensional display screen. The apparatus according to the present invention comprises a display unit having a two-dimensional display screen for displaying a three-dimensional object image as a perspective view and a cursor indicating a position on the two-dimensional display screen, an instructing unit for issuing an instruction to rotate the three-dimensional object image by moving the cursor to a desired point on the display screen, a circle data generating unit for generating circle data for drawing a circle on the display screen, and a directional segment data generating unit for generating directional segment data of a line. The display unit displays, based on the circle data and the directional segment data, the circle and a directional segment directed from the desired point to the center of the circle by overlapping them with the three-dimensional object image being displayed. The apparatus further comprises a hemisphere data generating unit for generating hemisphere data. The circumference of the bottom surface of the hemisphere is the same as the circle. The apparatus further comprises a display control unit for rotating the perspective view by changing a view point from the vertex of the hemisphere to a new view point on the hemisphere. The projection of the new view point from the top view to the bottom surface of the hemisphere is the desired point of the cursor.

Preferably, the hemisphere data generating unit comprises an angle and direction calculating unit for calculating a rotation angle and a rotation direction necessary to move the new view point to the vertex of the hemisphere through the surface of the hemisphere. The display control unit converts the data of the three-dimensional object image to rotate the three-dimensional object image by the rotation angle in the rotation direction.

Preferably, the instructing unit comprises a mouse having a first switch for inputting position data of the cursor into a panning control unit and for moving the cursor, a second switch for instructing a panning operation of a parallel movement of the three-dimensional object image displayed on the display screen, and a third switch for instructing a panning operation of a rotation of the three-dimensional object image displayed on the display screen.

Preferably, the apparatus further comprises a boundary line data generating unit, operatively connected to the instructing unit, for generating, when the second switch is operated to instruct a parallel panning movement of the three-dimensional object image, a boundary line representing a displayable range of the three-dimensional object image assuming that the current cursor position becomes the center of the displayable range of the display screen. The directional segment data generating unit generates another directional segment data of another directional segment of a line directed from the center of the displayable range to the center of the display screen. The display control unit moves the three-dimensional object image along the other directional segment of a line by a distance equal to the length of the other directional segment of a line.

Preferably, the panning operation for rotation is instructed by pressing the third switch, and the display of the rotation is instructed by releasing the third switch.

Preferably, the parallel panning movement is instructed by pressing the second switch, and the display of the parallel movement is instructed by releasing the second switch.

According to another aspect of the present invention, there is provided a three-dimensional object drawing method for rotating a perspective view of a three dimensional object image displayed on a two-dimensional display screen, comprising the steps of instructing the rotation of the three-dimensional object image by moving the cursor to a desired point on the display screen, displaying, by overlapping with the three-dimensional object image on the display screen, a circle and a segment of a directional line extending from the desired point to the center of the circle, the circle and the directional line segment being used as a panning guide, generating hemisphere data of a hemisphere having a bottom surface, the circumference of the bottom surface being the same as the circle, and rotating the three-dimensional object image by changing a view point from the vertex of the hemisphere to a new view point on the hemisphere, the projection of the new view point from the top view to the bottom surface of the hemisphere being the desired point of the cursor.

According to still another aspect of the present invention, there is provided a three-dimensional object drawing method for rotating a three-dimensional object image displayed on a display screen, comprising the steps of displaying a panning guide by making it overlap the three-dimensional object image, when a panning operation for rotation is instructed, the panning guide including a circle having a size within the display screen area and a directional line segment directed from a cursor position to the center of the circle, changing the direction, the length, and the displayable range of the directional segment of a line in accordance with the cursor movement, generating, when a three-dimensional object image after the panning operation is instructed to be displayed, hemisphere data of a hemisphere having a bottom surface the circumference of which is the same as the circle, determining a new view point on the hemisphere, the new view point being projected to the cursor position when the hemisphere is viewed from its top view, and drawing a three-dimensional object image when the three-dimensional object is viewed from the new view point.

Preferably, the method further comprises the steps of determining a rotation angle between the new view point and the vertex of the hemisphere, and determining a rotation direction necessary to move the new view point to the vertex of the hemisphere through the surface of the hemisphere, the rotating step comprising the step of converting the data of the three-dimensional object image to rotate the three-dimensional object image by the rotation angle in the rotation direction.

Preferably, the above method further comprises the steps of drawing another panning guide, when a panning operation for parallel movement is instructed, the other panning guide including a boundary line representing a displayable range assuming that the cursor position becomes the center of the displayable range, and another directional line segment directed from the current cursor position to the center of the displayable range, changing the direction and length of the other directional line segment in accordance with the cursor movement operation, to move the position of the displayable range, and moving, when a display of the three-dimensional object image after the panning operation for parallel movement is instructed, the three-dimensional object image in parallel so that the cursor position is drawn at the center of the screen.

Preferably, the instructing step comprises a step of using a mouse having a first switch for generating position data of the cursor and for moving the cursor, a second switch for instructing a panning operation of a parallel movement of the three-dimensional object image displayed on the display screen, and a third switch for instructing a panning operation for a rotation of the three-dimensional object image displayed on the display screen.

Preferably, in the above method, when the third switch is operated, the instruction to rotate the three-dimensional object image is given, and when the second switch is operated, the circle data and the directional segment data are removed.

Preferably, in the above method, the panning operation for rotation is instructed by pressing the third switch, and a display of rotation is instructed by releasing the third switch.

Preferably, in the above method, the panning operation for parallel movement is instructed by pressing the second switch, and a display in accordance with a parallel movement is instructed by releasing the second switch.

In operation, when a panning operation for a rotation is instructed by means of the mouse, the panning control unit draws a circle on the display screen. The circle should have a size smaller than the display screen. The circle is drawn by making it overlap the three-dimensional object image being displayed. A directional line segment directed from the position of the cursor to the center of the circle is also displayed by overlapping it with the three-dimensional object image being displayed. The direction and length of the direction segment are changed in accordance with a cursor movement operation by means of the mouse. Then, when a display of the three-dimensional object after the panning operation is instructed by the mouse, the display control unit draws a three-dimensional object image which is a view of the three-dimensional object when it is viewed from a point on a hemisphere having a bottom surface the circumference of which is the same as the circle. The point on the hemisphere is projected to the cursor position when the hemisphere is viewed from its top plan view.

By this operation, the view direction can be recognized intuitively by means of the direction and the length of the directional line segment so that an operator can easily estimate the view direction, and a perspective view when viewed from that direction can be drawn on the screen, resulting in an improvement in the efficiency of the operation.

Also, when the three-dimensional object is being drawn by using, as a screen view point, a first point on the hemisphere projected on the center of the circle, and by using, as a view direction, the direction from that screen point to the center of the circle, the view direction can be determined by determining the rotation angle and the rotation direction necessary to move the second point to the first point through the surface of the hemisphere, so that the image of the three-dimensional object when viewed from the first point can be easily drawn.

Further, when a panning operation of a parallel movement is instructed by the mouse, the panning control unit draws a boundary line representing a displayable range of the three-dimensional object image when the point indicated by the cursor is drawn at the center of the screen, and a directional line segment directed from that point to the center of the screen. The panning control unit changes the direction and the length of the directional line segment and the displayable range in accordance with the cursor movement. When a display of the three-dimensional object after the panning operation is instructed, the display control unit draws the three-dimensional object image by moving it in parallel in such a way that the point indicated by the cursor is drawn at the center of the screen. By this operation, the direction of the directional line segment becomes the direction of a line along which the parallel movement is effected, and its length becomes the moved distance effected by the parallel movement so that the operator can easily display the parallel movement of the three-dimensional object image as he desired, by pan hitting.

Further, by providing, in the mouse, a panning switch for rotation and a panning switch for a parallel movement, and by pressing the switches to effect a panning operation instruction for rotation or a panning instruction for a parallel movement, and by releasing the switches, to output an instruction to display the three-dimensional object after the panning operation, the parallel movement display or rotation display can be effected by an easy operation.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENT

Figure 1:
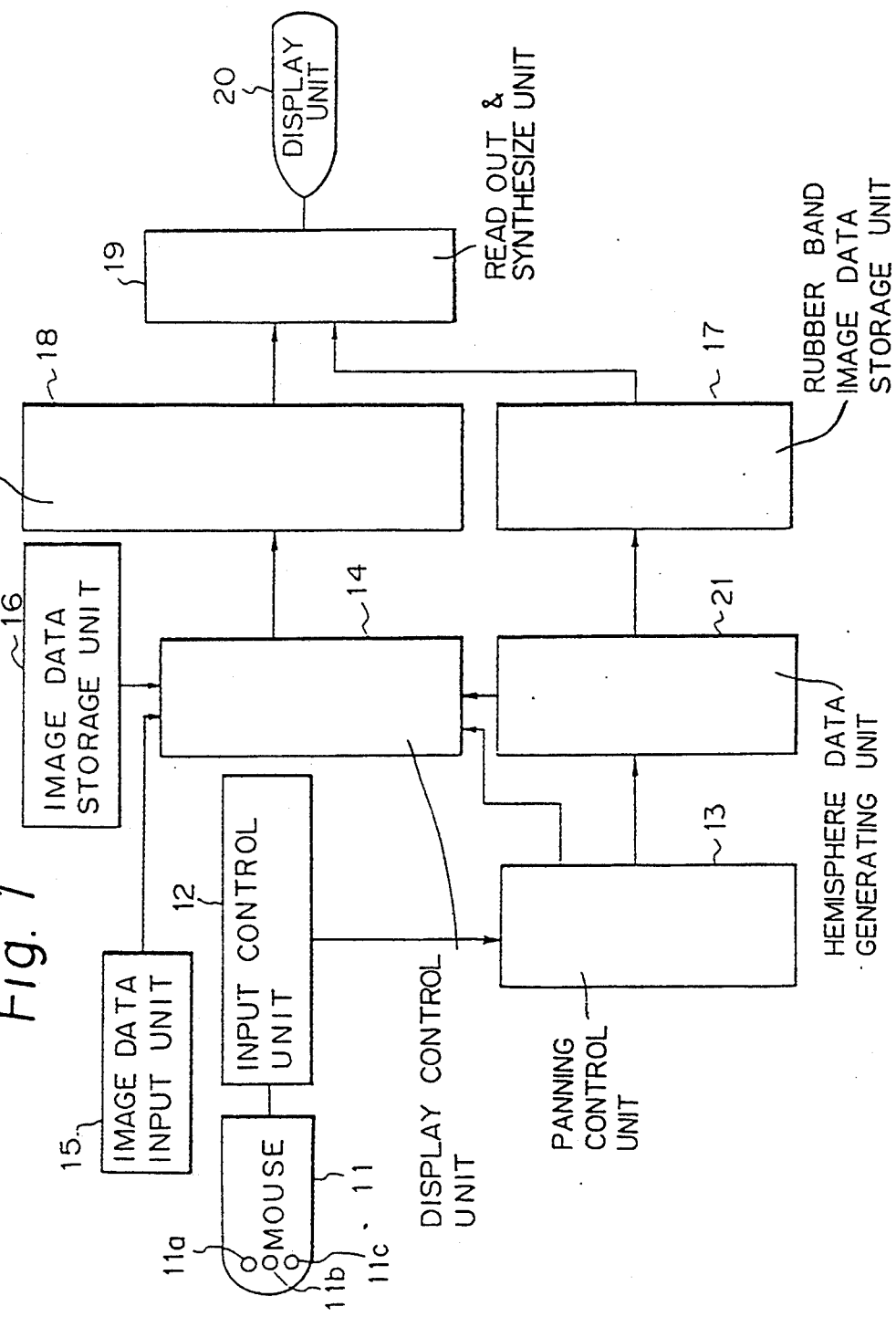
FIG. 1 is a block diagram of a three-dimensional object drawing apparatus according to an embodiment of the present invention.

FIG. 1 is a block diagram of a three-dimensional object drawing apparatus according to an embodiment of the present invention. In FIG. 1, 11 is a mouse. Mouse 11 acts as an instructing unit for effecting a panning operation to move a graphic cursor on a display screen 22 (see FIGS. 7A, 7B, 8A to 8C), for a rotation display or for a parallel movement display. On the surface of the mouse 11, there are provided three switches 11a, 11b, and 11c and a track ball (not shown in the figure). The first switch 11a is used for inputting a coordinate value of the cursor on the display screen 22 into the apparatus; the second switch 11b is used for a panning operation for a parallel movement; and the third switch 11c is used for a panning operation for a rotation movement.

By rotating the track ball, the cursor on the screen 22 is moved; and by pressing the first switch 11a, the coordinate value of the point indicated by the cursor is input into the apparatus. Also, by pressing the second switch 11b, the panning operation for a parallel movement is instructed; and by releasing the switch, the parallel movement display of the three-dimensional object image is instructed. Further, by pressing the third switch 11c, a panning operation for a rotation movement is instructed, and by releasing the switch, the rotation display of the three-dimensional object image is instructed.

12 is an input control unit for generating a movement signal for moving the cursor along an axial direction in accordance with the rotation of the track ball, and for outputting an ON or OFF state of each of the switches 11a to 11c into a panning control unit 13.

When a rotation movement is instructed by the mouse 11, the panning control unit 13 generates circle data of a circle to be displayed on the display screen by overlapping the circle with the three-dimensional object image being displayed, and generates directional segment data of a line indicating a new view direction. When a parallel movement is instructed by the mouse 11, the panning control unit 13 and generates boundary line data and directional segment data of a line indicating the amount of a parallel movement.

21 is a hemisphere data generating unit for calculating new view direction data when a rotation movement is instructed by the mouse 11.

14 is a display control unit for generating, based on the new view direction data for the rotation movement or the amount of the parallel movement output from the panning control unit 13 based on the panning operation, a three-dimensional object image after the parallel movement or the three-dimensional object image when the object is viewed from the new view direction.

15 is an image data input unit such as a host unit for inputting a three-dimensional object image; 16 is an image data storage unit for storing three-dimensional object image data input from an image data input/output unit; and 17 is a resizable image data storage unit, or, in other words, a rubber band image data storage unit, for storing the circle data, directional segment data, or boundary line data as panning guide data for easily effecting a parallel movement or rotation operation when a panning operation is to be carried out. The panning guide can be made to be any form as desired as if it were a rubber band. Therefore, the unit 17 is hereinafter referred to as a rubber band image data storage unit. 18 is a three-dimensional object image storage unit for storing a three-dimensional object image; 19 is a read out/synthesize unit for reading and synthesizing a dot image from the image storage units 18 and 19 in synchronization with a raster scan; and 20 is a display unit for drawing an image.

Figure 2:
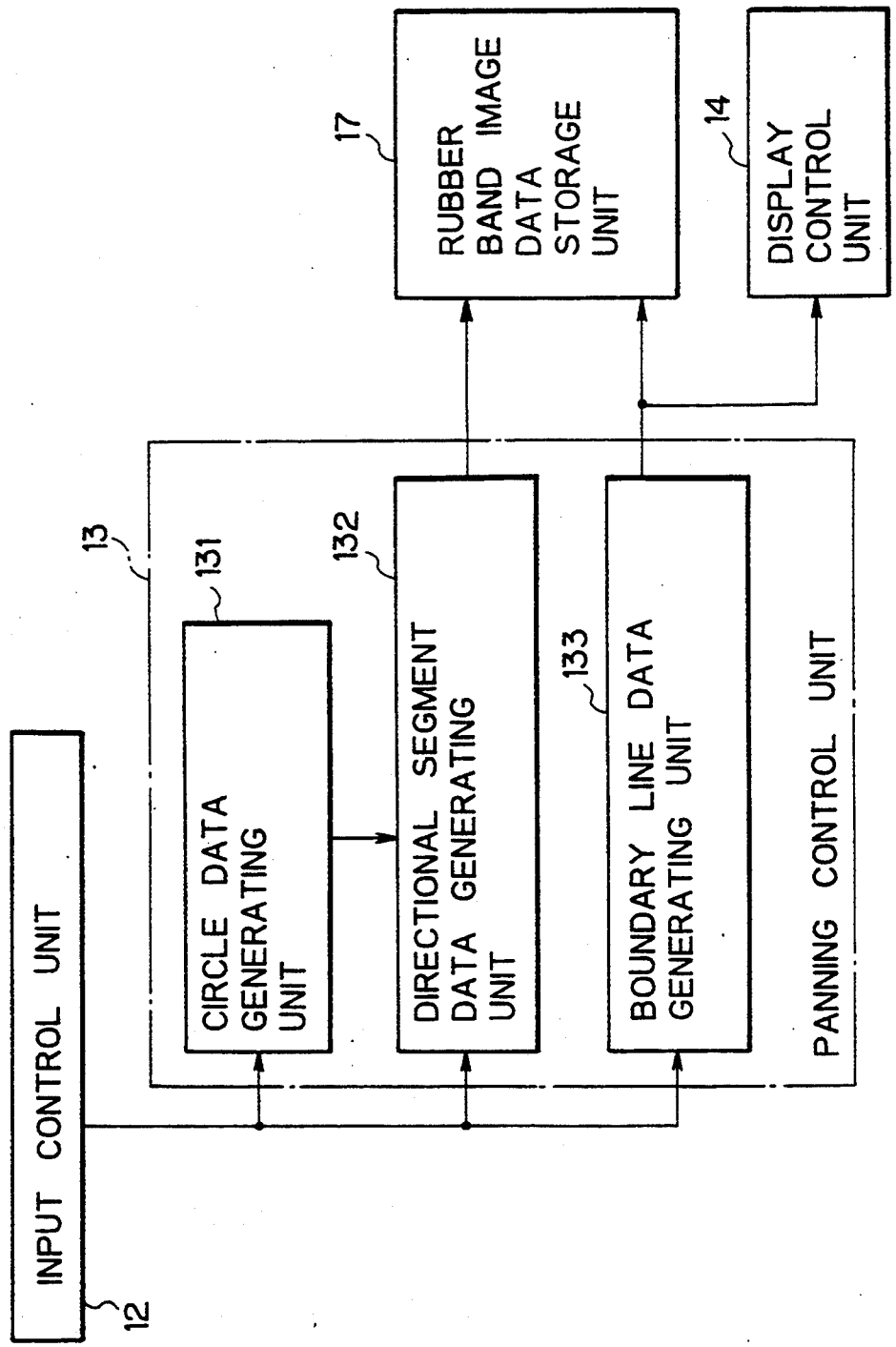
FIG. 2 is a block diagram of a panning control unit in the block diagram of FIG. 1.

FIG. 2 is a block diagram of the panning control unit 13 in the block diagram of FIG. 1. In FIG. 2, the panning control unit 13 includes a circle data generating unit 131 for generating circle data of a circle when a rotation movement is instructed by the mouse 11, a directional segment data generating unit 132 for generating directional segment data of a directional line segment directed from a cursor position to the center of the circle when a rotation movement is instructed, or of a directional line segment directed from the cursor position to the center of a new displayable range when a parallel movement is instructed, and a boundary line data generating unit 133 for generating a boundary line indicating the new displayable range when a parallel movement is instructed.

Figure 3:
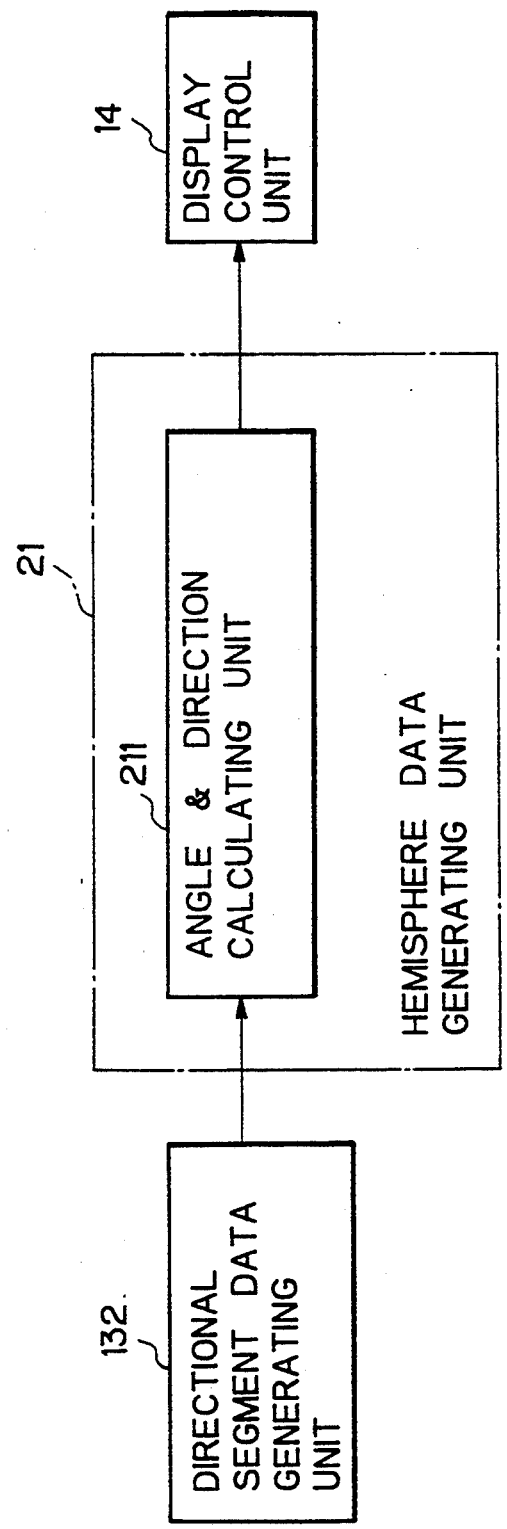
FIG. 3 is a block diagram of a hemisphere data generating unit in the block diagram of FIG. 1.

FIG. 3 is a block diagram of the hemisphere data generating unit 21 in the block diagram of FIG. 1. In FIG. 3, the hemisphere data generating unit 21 includes an angle and direction calculating unit 211 for calculating, when a rotation movement is instructed by the mouse 11, an angle $\theta$ between a point P2 on the hemisphere HCB and the vertex point P1 of the hemisphere HCB (see FIG. 7A). The point P2 is a projection of the cursor point Pe when the hemisphere HCB is viewed from its top plan view.

Overall Operation

Figure 4:
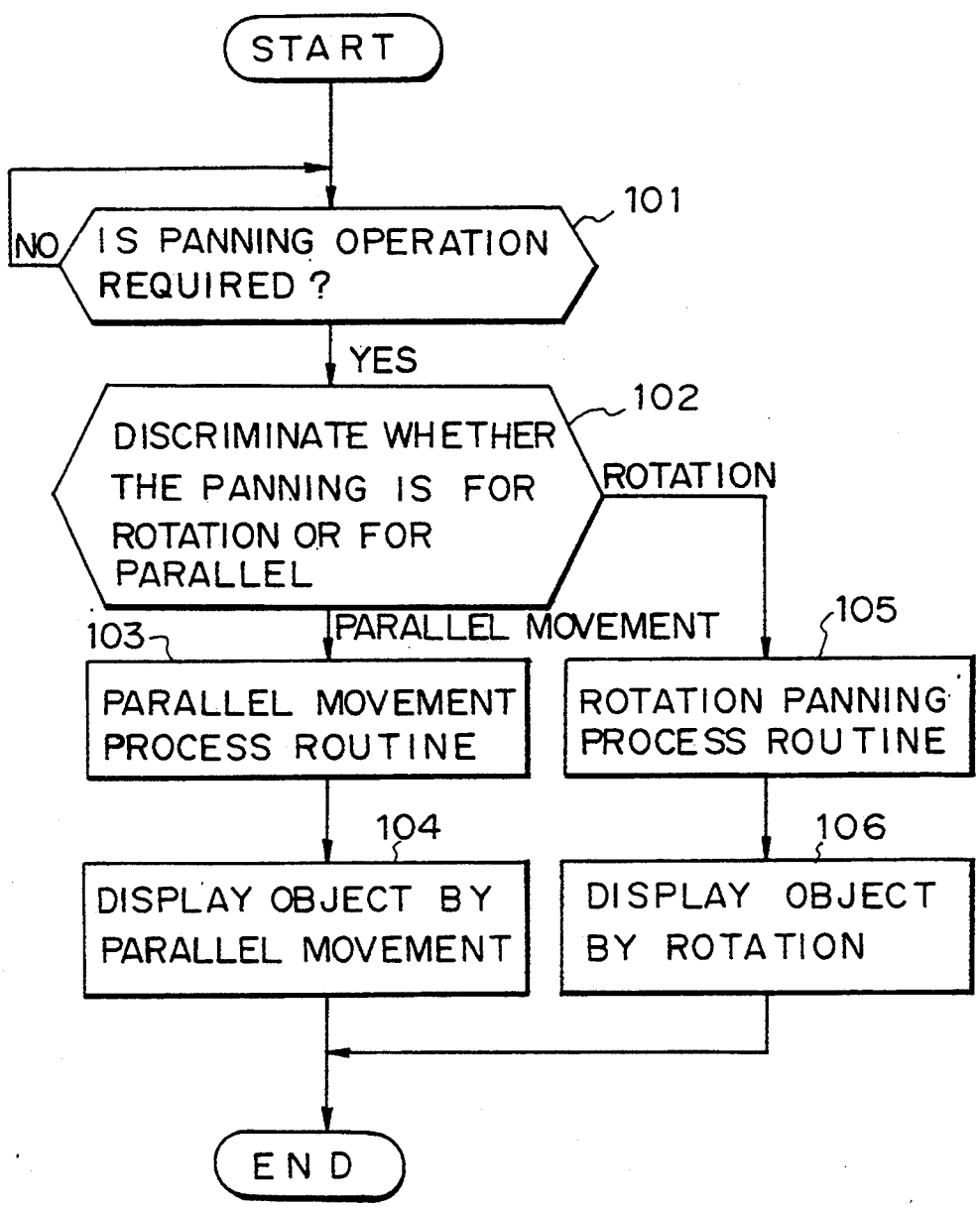
FIG. 4 is a flowchart generally explaining a rotation operation and a parallel movement operation according to an embodiment of the present invention.

FIG. 4 is a flowchart generally explaining a rotation operation and a parallel movement operation according to an embodiment of the present invention.

In operation, the panning control unit 13 supervises whether there is a request for a panning operation generated by pressing the second switch 11b or the third switch 11c of the mouse 11 (step 101). When there is a request for a panning operation, a judgement is made as to whether it is a panning operation for a parallel movement by pressing the second switch 11b or the panning operation for a rotation movement by pressing the third switch 11c (step 102).

Figure 5:
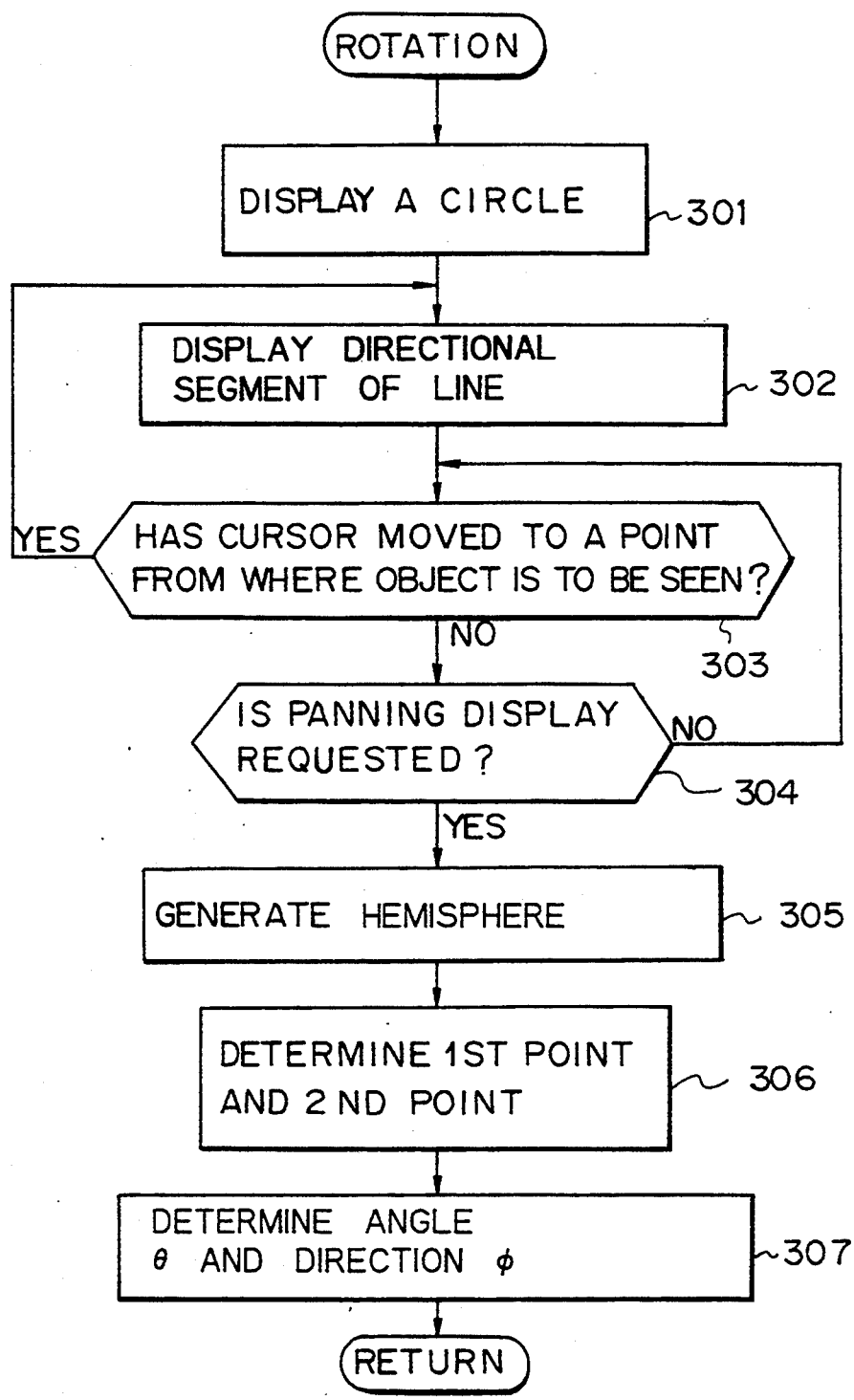
FIG. 5 a flowchart explaining the rotation operation in detail according to an embodiment of the present invention.

When a panning operation for a rotation display is requested, a rotation panning process routine shown in FIG. 5 is carried out so that a new view direction is calculated by the hemisphere data generating unit 21 and is output to the display control unit 14 (step 105). The display control unit 14 carries out, based on the input view direction data, a converting process for rotating the image data to generate a three-dimensional object image based on the converted result, stores the image into the three-dimensional object image storage unit 18, and then displays it on the screen 20 (step 106).

Figure 6:
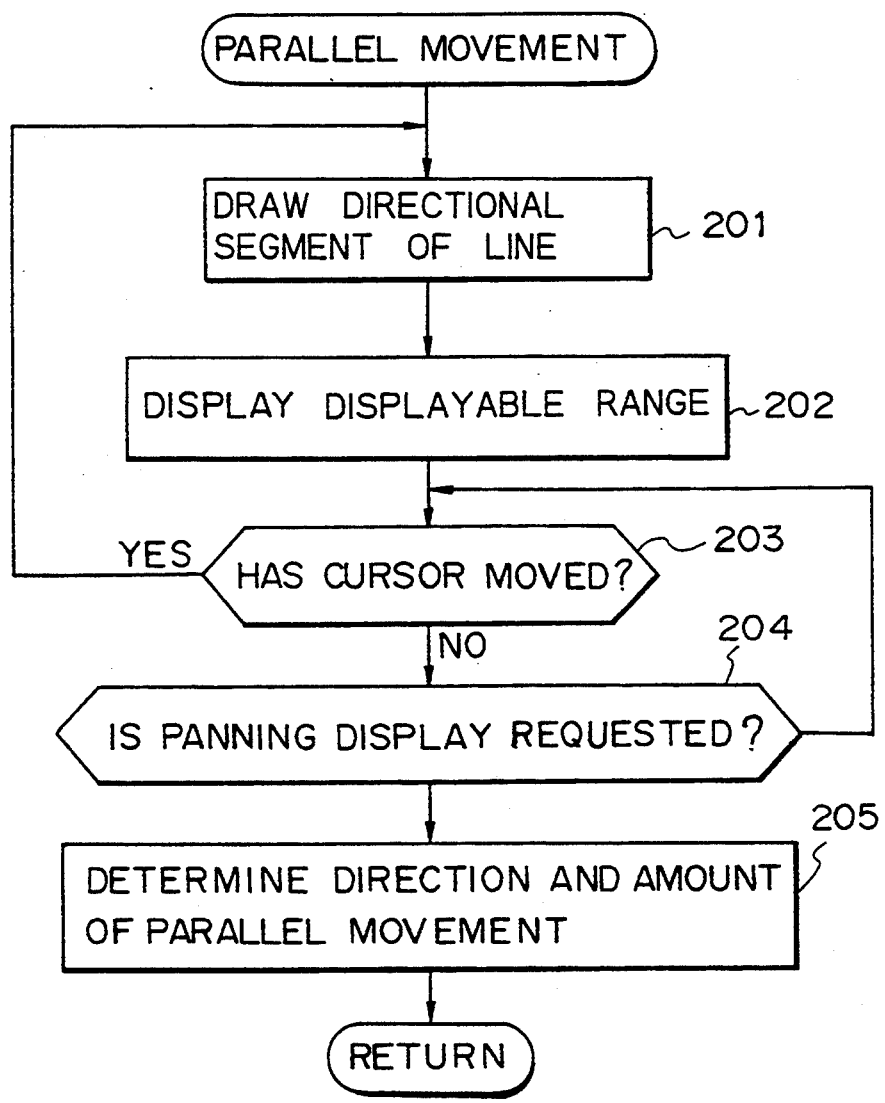
FIG. 6 is a flowchart explaining the parallel movement operation according to an embodiment of the present invention.

On the other hand, when the panning operation for a parallel movement display is requested, a parallel movement panning process routine shown in FIG. 6 is carried out so that the amount of parallel movement along each axial direction is calculated and is output to the display control unit 14 (step 103). The display control unit 14 carries out, based on the input amount of parallel movement, a process of converting the image data stored in the image data storage unit 16 to generate a three-dimensional object image data based on the converted result, stores the image data in the three-dimensional object image storage unit 18, and then displays the parallel movement on the display screen 22 (step 104).

A Panning Control for a Rotation Movement

Figure 7A:
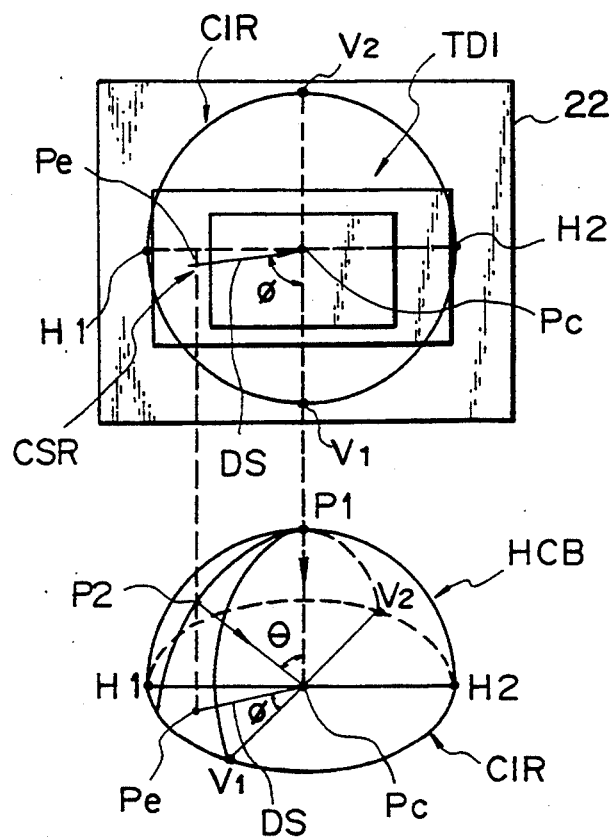
FIG. 7A and FIG. 7B are explanatory diagrams of the rotation operation according to an embodiment of the present invention.
Figure 7B:
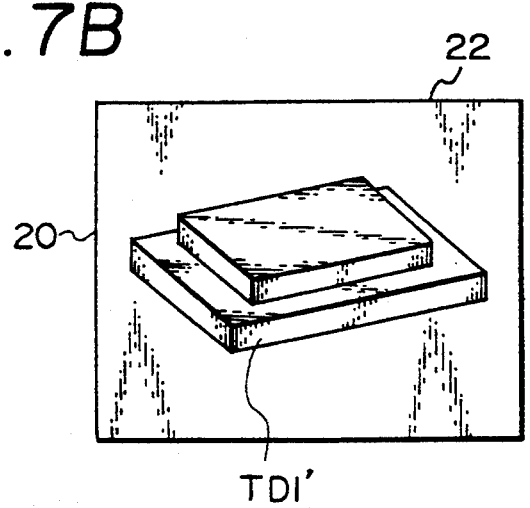

FIG. 5 is a flowchart explaining the rotation operation in detail according to an embodiment of the present invention, and FIGS. 7A and 7B are explanatory diagrams for the rotation operation.

An explanation is given for a case in which, in a state when an image TDI of a three-dimensional object is displayed from its top plan view on the two-dimensional surface of the display screen 22 as shown in FIG. 7A, for example, the image is rotated in such a way that the three-dimensional object is viewed from a new view direction.

When the third switch 11c on the mouse 11 is pressed, an instruction to rotate the image is provided so that the circle data generating unit 131 in the panning control unit 13 generates circle data of a circle CIR having a predetermined radius with its center Pc at the center of the display screen 22. The radius of the circle CIR should be shorter than half of the shorter side of the display screen 22. Namely, the circle CIR should be smaller than the display screen 22. The circle data is stored in the rubber band image storage unit 17. The read out and synthesize unit 19 reads out the circle data from the rubber band image storage unit 17 and outputs it to the display unit 20 so that the circle CIR overlaps the three-dimensional object image TDI on the display screen 22 (step 301). Then, the directional segment data generating unit in the panning control unit 13 generates directional segment data of a directional segment DS of a line directed from the position Pe of the cursor CSR to the center Pc of the circle. The directional segment data is also stored in the rubber band image storage unit 17. The read out and synthesize unit 19 reads the directional segment data from the rubber band image storage unit 17 and outputs it to the display unit 20. Thus, the directional segment DS is drawn so as to overlap three-dimensional object image TDI and the circle CIR on the display screen 22. If the cursor position Pe is a new position corresponding to the new view point, the angle $\phi$ between the directional segment DS and a vertical line $V_1$-$V_2$ of the circle CIR represents the direction of the rotation.

Next, the panning control unit 13 supervises whether the cursor CSR is moved to change the view direction (step 303). If the cursor CSR is moved, the process returns to the step 302 to generate a new directional line segment DS and display it on the display screen 22. Thus, the direction and length of the directional line segment DS are changed in accordance with the cursor movement operation.

If the cursor CSR is not moved, it is determined whether or not the third switch 11c is released so that a display of the three-dimensional object image after a panning operation (a display of the three-dimensional object when it is viewed from the point P2 to the center Pc) is requested. If the third switch 11c is not released, the process returns to the step 303.

On the other hand, if the third switch 11c is released so that a display of the three-dimensional object image after a panning operation is requested, hemisphere data of a hemisphere HCB, shown in FIG. 7A, having a bottom surface, the circumference of which is the same as the circle CIR, is generated (step 305). The hemisphere HCB is not displayed on the display screen 22, but is used to determine a new view direction and to calculate the rotation angle $\theta$.

Namely, in the angle and direction calculating unit 211 in the hemisphere data generating unit 21, data processing is carried out so that the circumference of the bottom surface of the hemisphere HCB is made to virtually coincide with the circle CIR. Then, a first point P1, which is the vertex point on the hemisphere HCB and is which projected at the center Pc of the circle when the hemisphere HCB is viewed from its top, is determined, and a second point P2, which is a point on the hemisphere HCB and which is projected on the cursor position Pe when the hemisphere HCB is viewed from its top, are determined (step 306). Note that the three-dimensional object image TDI is an image of a three-dimensional object drawn by taking the first point P1 as a view point and the direction from the view point P1 to the center Pc of the circle CIR as a view direction. The direction from the second point P2 to the center Pc of the circle CIR is a new view direction, set by the operator at step 303, for viewing the three-dimensional object.

The rotation angle $\theta$ necessary for moving the second point P2 to the first point P1 through the surface of the sphere HCB, and an angle $\phi$ between the directional segment DS of a line and the line $V_1$-$V_2$, are then determined. These angles are input, as a view direction, to the display control unit 14 (step 307). The display control unit 14 then performs, based on the input view direction data $\theta$ and $\phi$, a conversion process for rotation of the image data, and then, based on the converted data, generates data of a perspective view image TDI' of the three-dimensional object when it is viewed from the point P2, stores the data in the three-dimensional object image storage unit 18, and displays it on the screen 22 as shown in FIG. 7B.

According to the above-mentioned panning operation, the view direction can be decided intuitionally based on the direction and the length of the directional segment DS of a line so that an operator can easily designate a view direction to draw a perspective view of a three-dimensional object when it is viewed from that direction, resulting in an improvement in the ease of operation.

A Panning Control for a Parallel Movement

Figure 8A:
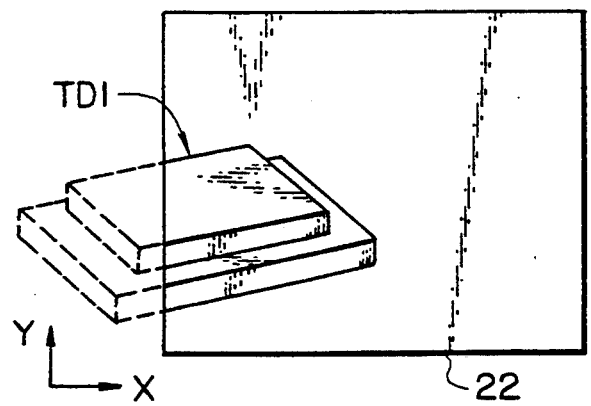
FIGS. 8A to 8C are explanatory diagrams of the parallel movement operation according to an embodiment of the present invention.
Figure 8B:
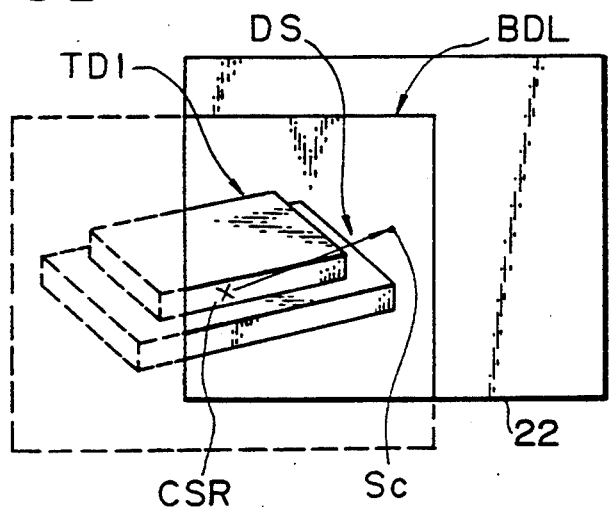
Figure 8C:
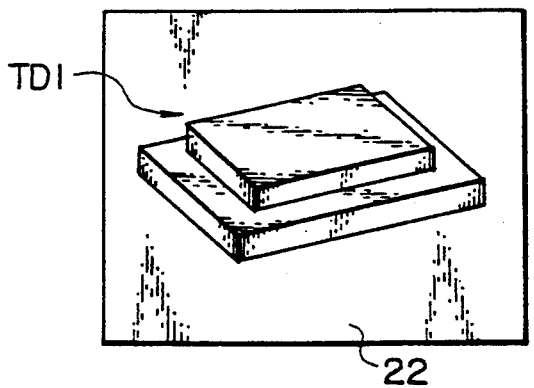

FIG. 6 is a flowchart explaining the parallel movement operation according to an embodiment of the present invention, and FIGS. 8A to 8C are explanatory diagrams of the parallel movement operation according to an embodiment of the present invention.

An explanation is given for a case in which, in a state when a three-dimensional object image TDI as shown in FIG. 8A, for example, is displayed on the display screen 22, the image TDI as a complete three-dimensional object is moved in parallel.

When the second switch 11b on the mouse 11 is pressed, the directional segment data generating unit 132 in the panning control unit 13 generates, as shown in FIG. 8B, data of a directional segment DS of a line from the point indicated by the cursor CSR to the center Sc of the display screen 22. The directional segment data is stored in the rubber band image storage unit 17. The read out and synthesize unit 19 reads the directional segment data and outputs it to the display unit 20. Thus the directional segment DS is displayed on the display screen 22 by making it overlap the three-dimensional object image TDI (step 201). Note that the direction of the directional line segment DS is the direction of the parallel movement, and the length of the directional segment is the amount of the parallel movement.

Also, the boundary line data generating unit 133 in the panning control unit 13 calculates a displayable range of the three-dimensional object image assuming that the point indicated by the cursor CSR becomes the center of the displayable range, and generates boundary data of a boundary line BDL indicating the displayable range. The boundary line data is stored, as a rubber band for a panning guide, in the rubber band image storage unit 17. The boundary line data is read by the read out and synthesize unit 19 wherein the boundary line data is synthesized with the three-dimensional object image data and the directional segment data. Thus, on the display screen, a part of the boundary line indicated by a solid line, the three-dimensional object image, and the directional segment DS are displayed (step 202).

After that, the panning control unit 13 determines whether the cursor CSR is moved by the operation of the mouse (step 203). If the cursor CSR is moved, the process returns to the step 201 to generate a new directional line segment DS and a boundary line BDL of a displayable range and display them on the display screen 22. Thus, in accordance with the cursor movement operation, the direction and length of the directional segment DS of a line and the displayable range are changed.

If the cursor is not moved, it is determined whether or not the second switch 11b is released so that a display of the three-dimensional object image after a panning operation (a display after a parallel movement) is requested. If the switch is not released, the process returns to the step 203.

On the other hand, if the press of the second switch 11b is released so that a display of the three-dimensional object after a panning operation is requested, the direction of the directional line segment DS is deemed as the direction of the parallel movement, and the length of the directional segment is deemed as the amount of the parallel movement. Then, the amount of movement Xs and Ys along the respective axis of the screen coordinate is calculated and input into the display control unit 14 (step 205). In this way, the display control unit 14 performs a conversion process for the parallel movement on the image data, based on the input amounts Xs and Ys of the parallel movement, and after that, based on the result of the conversion, generates a three-dimensional object image and stores it in the image storage unit 18. Then, as shown in FIG. 8C, the three-dimensional object image after the parallel movement is displayed on the display screen 22.

In the above-described panning operation, the direction of the directional line segment DS is the direction of the parallel movement, and its length is the amount of the parallel movement. Therefore, an operator can move a three-dimensional object image in parallel by pan hitting a point as desired, resulting in easy operation.

In the above description, embodiments of the present invention are described. There are, however, various modifications possible within the scope of claim for patent of the present invention. The present invention does not exclude these modifications.

As described above, according to the present invention, when a panning operation for a rotation is instructed, a circle having a predetermined radius and a directional line segment directed from the cursor position to the center of the circle are drawn so as to overlap a three-dimensional object image being displayed, and the direction and the length of the directional segment of a line are changed in accordance with a cursor movement operation. When a three-dimensional object display after the panning operation is instructed, hemisphere data of a hemisphere having a bottom surface the circumference of which is the same as the circle is generated, and a point on the hemisphere projected at the cursor position is made to be a new view point from which the three-dimensional object is viewed to draw an image. By this construction, the direction and the length of the directional line segment can be recognized intuitionally so that the direction viewed by the operator can be easily designated and a perspective view of the three-dimensional object when it is viewed from that direction can be drawn on the screen, resulting in an improvement in the ease of operation.

In addition, according to the present invention, when a three-dimensional object is drawn by using, as a screen point, a first point P1 on the hemisphere projected onto the center of the circle, and by using, as a view direction, the direction from that screen view point to the center of the circle, a rotation angle $\theta$ and a rotation direction $\phi$ necessary to move the the second point to the first point position through the sphere are determined, and by using the angles $\theta$ and $\phi$, a rotation conversion process is performed on the image data to effect a rotation display of the three-dimensional object image. By this construction, the three-dimensional object image viewed from the point P2 can be drawn by a simple process.

Further, according to the present invention, when a panning operation for a parallel movement is instructed by a mouse, a boundary line indicating a displayable range of the three-dimensional object image when the point indicated by the cursor is assumed to be drawn at the center of the screen, and a directional line segment directed from that point to the center of the screen, are drawn. In accordance with the cursor movement, the direction and the length of the directional line segment and the displayable range can be changed and displayed in accordance with the cursor movement operation. When a display of the three-dimensional object after the panning operation is instructed, the three-dimensional object image is drawn by moving in parallel in such a way that the point indicated by the cursor is drawn at the center of the display screen. By this construction, the direction of the directional line segment is the direction of the parallel movement and its length is the amount of the parallel movement. Therefore, a parallel movement display of a three-dimensional object image can be effected by a simple operation and by a pan hit as desired by an operator.

Still further, according to the present invention, a panning switch for rotation and a panning switch for parallel movement are provided on the mouse. By pressing the switch, a panning operation for rotation or a panning operation for a parallel movement is instructed. By releasing the switch, an instruction to display the three-dimensional object after the panning operation is output. By this construction, a parallel movement display or a rotation movement display can be effected by a simple operation.

I claim:

1. A method for rotating a perspective view of a three-dimensional object image displayed on a two-dimensional display screen, the perspective view of the three-dimensional object image being rotated from an original view point to a desired view point and a cursor indicating the desired view point on the display screen, the method comprising the steps of:

instructing a rotation of the perspective view of the three-dimensional object image from the original view point to the desired view point, by moving the cursor to the desired view point on the display screen;

displaying a circle on the display screen, the circle overlapping the three-dimensional object image displayed on the display screen, the desired view point corresponding to a first point in the area of the circle;

displaying a line segment on the display screen, the line segment directed from the first point in the area of the circle to the center of the circle;

generating a hemisphere having a top surface and a circular bottom surface, the circumference of the bottom surface being the circle, where a second point on the top surface of the hemisphere represents the first point projected to the top surface of the hemisphere, the desired view point is a projection from the second point to the bottom surface of the hemisphere and the original view point is a projection from the vertex of the hemisphere; and rotating the perspective view of the three-dimensional object image by changing the view point from the original view point to the desired view point.

2. A method as claimed in claim 1, wherein:

the step of generating a hemisphere comprises calculating a rotation angle and a rotation direction to move the desired view point to the vertex of the hemisphere; and the step of rotating the perspective view of the three-dimensional object image comprises rotating the perspective view of the three-dimensional object image by the rotation angle in the rotation direction.

3. A method as claimed in claim 2, wherein the step of displaying a circle and the step of displaying a line segment generate image data in response to an instruction to rotate the perspective view of the three-dimensional object image, the image data including circle data relating to the circle and directional segment data relating to the line segment, the method further comprising storing the image data.

4. A method as claimed in claim 3, wherein the method allows for either a parallel movement of the perspective view of the three-dimensional object image or a rotation of the perspective view of the three-dimensional object image, and the steps of displaying a circle, displaying a line segment, generating a hemisphere and rotating the perspective view of the three-dimensional object image are performed only when a rotation is instructed and wherein the method uses a mouse comprising a first switch to input a position of the cursor and to move the cursor, a second switch to instruct a parallel movement of the perspective view of the three-dimensional object image displayed on the display screen, and a third switch to instruct a rotation of the perspective view of the three-dimensional object image displayed on the display screen, wherein the step of instructing a rotation uses the mouse to input a position of the cursor, to move the cursor and to instruct a rotation of the perspective view of the three-dimensional object image, the method further comprising a step of instructing a parallel movement of the perspective view of the three-dimensional object image which uses the mouse to input a position of the cursor, to move the cursor and to instruct a parallel movement of the perspective view of the three-dimensional object image.

5. A method as claimed in claim 4, wherein the step of instructing a rotation comprises, when the third switch is operated, instructing a rotation of the perspective view of the three-dimensional object image and the step of instructing a parallel movement comprises, when the second switch is operated, instructing a parallel movement of the perspective view of the three-dimensional object image.

6. A method as claimed in claim 5, further comprising, when the second switch is operated to instruct a parallel movement of the perspective view of the three-dimensional object:
    generating a boundary representing a range of the three-dimensional object image displayable on the display screen, where the cursor position when the second switch is operated is the center of the range;
    displaying a line segment directed from the center of the range to the center of the display screen; and
    moving the perspective view of the three-dimensional object image along the line segment by the distance equal to the length of the line segment.

7. A method as claimed in claim 6, wherein the step of instructing a rotation comprises instructing a rotation by pressing the third switch, and the step of rotating the perspective view of the three-dimensional object image comprises displaying, when the third switch is released, the rotated perspective view of the three-dimensional object image.

8. A method as claimed in claim 6, wherein the step of instructing a parallel movement of the perspective view of the three-dimensional object image comprises instructing a parallel movement by pressing the second switch, the method further comprising:
    displaying, when the second switch is released, the moved perspective view of the three-dimensional object image.

9. A method for displaying a perspective view of a three-dimensional object image on a display screen, the perspective view of the three-dimensional object image being rotated from an original view point to a desired view point and a cursor indicating a position on the display screen, the method comprising the steps of:
    instructing a rotation of the perspective view of the three-dimensional image from the original view point to the desired view point on the display screen;
    displaying a circle on the display screen, the circle overlapping the three-dimensional object image, the circle having a radius which allows the entire circle to be displayed on the display screen, the desired view point corresponding to a first point in the area of the circle;
    displaying a line segment on the display screen, the line segment directed from the first point to the center of the circle;
    changing the direction, the length, and the displayable range of the line segment in accordance with the movement of the cursor;
    generating a hemisphere having a top surface and a circular bottom surface, the circumference of the bottom surface being the circle, where a second point on the top surface of the hemisphere represents the first point projected to the top surface of the hemisphere, the desired view point is a projection from the second point to the bottom surface of the hemisphere and the original view point is a projection from the vertex of the hemisphere; and
    displaying a perspective view of the three-dimensional object image on the display screen, as viewed from the desired view point.

10. A method as claimed in claim 9, further comprising the steps of:
    determining a rotation angle between the desired view point and the vertex of the hemisphere; and
    determining a rotation direction to move the desired view point to the vertex of the hemisphere;
    wherein the step of displaying a perspective view of the three-dimensional object image comprises rotating the perspective view of the three-dimensional object image by the rotation angle in the rotation direction.

11. A method as claimed in claim 10, wherein the method allows for either a rotation of the perspective view of the three-dimensional object image or a parallel movement of the perspective view of the three-dimensional object image, the perspective view of the three-dimensional object image being moved from the original view point to the desired view point when a parallel movement is instructed, the steps of displaying a circle, displaying a line segment, changing the direction, generating a hemisphere and displaying the perspective view of the three-dimensional object image are performed only when a rotation is instructed, further comprising the step of instructing a parallel movement of the perspective view of the three-dimensional image from the original view point to the desired view point on the display screen and, when a parallel movement is instructed, the following steps are performed:
    displaying a boundary representing a range of the three-dimensional object image displayable on the display screen, where the position indicated by the cursor is the center of the range;
    displaying a line segment directed from the current cursor position to the center of the range;
    changing the direction and length of the line segment in accordance with movement of the cursor; and
    moving the perspective view of the three-dimensional object image on the display screen by moving the current position indicated by the cursor to the center of the display screen.

12. A method as claimed in claim 11, wherein the method uses a mouse comprising a first switch to input a position of the cursor and to move the cursor, a second switch to instruct a parallel movement of the perspective view of the three-dimensional object image displayed on the display screen, and a third switch to instruct a rotation of the perspective view of the three-dimensional object image displayed on the display screen, wherein the step of instructing a rotation uses the mouse to instruct a rotation and the step of instructing a parallel movement uses the mouse to instruct a parallel movement.

13. A method as claimed in claim 12, wherein
the step of instructing a rotation comprises, when the third switch is operated, instructing a rotation of the perspective view of the three-dimensional object image; and
the step of instructing a parallel movement comprises, when the second switch is operated, instructing a parallel movement of the perspective view of the three-dimensional object image.

14. A method as claimed in claim 13, wherein the step of instructing a rotation comprises instructing a rotation by pressing the third switch, and the step of displaying perspective view of the three-dimensional object image, when an instruction of rotation is made, comprises displaying the perspective view of the three-dimensional object image when the third switch is released.

15. A method as claimed in claim 13, wherein the step of instructing a parallel movement comprises instructing a parallel movement by pressing the second switch, and the step of moving the perspective view of the three-dimensional object image comprises moving the perspective view of the three-dimensional object image when the second switch is released.

16. An apparatus for rotating a perspective view of a three-dimensional object image displayed on a two-dimensional display screen, the perspective view being rotated from an original view point to a desired view point, the apparatus comprising:
display means, comprising a two-dimensional display screen and a cursor which indicates the desired view point on the display screen, for displaying a perspective view of the three-dimensional object image corresponding to the original view point on the display screen;
instructing means for instructing the apparatus, by moving the cursor to the desired view point on the display screen, to rotate the perspective view of the three-dimensional object image from the original view point to the desired view point;
circle data generating means for determining, when an instruction to rotate the perspective view of the three-dimensional object image is made by the instructing means, a circle that overlaps the three-dimensional object image displayed on the display screen, the desired view point corresponding to a first point in the area of the circle, and for generating circle data which represents the circle, the display means displaying the circle represented by the circle data on the display screen;
directional segment data generating means for determining, when an instruction to rotate the perspective view of the three-dimensional object image is made by the instructing means, a line segment directed from the first point in the area of the circle to the center of the circle, and for generating direction segment data which represents the line segment, the display means displaying the line segment represented by the direction segment data by overlapping the line segment with the circle and the three-dimensional object image;
hemisphere data generating means for determining, when an instruction to rotate the perspective view of the three-dimensional object image is made by the instructing means, a hemisphere having a top surface, a vertex on the top surface and a circular bottom surface, the circumference of the bottom surface being the circle, and for generating hemisphere data representing the hemisphere, where a second point on the top surface of the hemisphere represents the first point in the area of the circle being projected to the top surface of the hemisphere, the desired view point is a projection from the second point to the bottom surface of the hemisphere and the original view point is a projection from the vertex of the hemisphere; and
display control means for rotating the perspective view of the three-dimensional object image on the display screen by changing the view point from the original view point to the desired view point.

17. An apparatus as claimed in claim 16, wherein the hemisphere data generating means comprises angle and direction calculating means for calculating a rotation angle and a rotation direction to move the desired view point to the vertex of the hemisphere, the display control means rotating the perspective view of the three-dimensional object image by the rotation angle in the rotation direction.

18. An apparatus as claimed in claim 17, wherein the circle data generating means and the directional segment data generating means together represent a panning control means for generating image data in response to an instruction from the instructing means to rotate the perspective view of the three-dimensional object image, the image data including the circle data and the directional segment data, the apparatus further comprising:
image data storing means for storing the image data, the display means displaying the circle and the line segment based on the image data stored in the image data storing means.

19. An apparatus as claimed in claim 18, the apparatus allowing for either a parallel movement or the perspective view of the three-dimensional object image or a rotation of the perspective view of the three-dimensional object image, wherein the instructing means comprises a mouse, the mouse comprising:
a first switch to input a position of the cursor into the panning control means and to move the cursor;
a second switch to instruct a parallel movement of the perspective view of the three-dimensional object image displayed on the display screen; and
a third switch to instruct a rotation of the perspective view of the three-dimensional object image displayed on the display screen.

20. An apparatus as claimed in claim 19, wherein, when the third switch is operated, an instruction to rotate the perspective view of the three-dimensional object image is sent to the panning control means and, when the second switch is operated, the apparatus is instructed to perform a parallel movement of the perspective view of the three-dimensional object image.

21. An apparatus as claimed in claim 20, further comprising boundary line data generating means for generating, when the second switch is operated to instruct a parallel movement of the perspective view of the three-dimensional object image, a boundary representing a range of the three-dimensional object image displayable on the display screen, where the cursor position when the second switch is operated is the center of the range, the directional segment data generating means determining a line segment directed from the center of the range to the center of the display screen and the display control means moving the perspective view of the three-dimensional object image along the line segment by a distance equal to the length of the line segment.

22. An apparatus as claimed in claim 6, wherein a rotation of the perspective view of the three-dimensional object is instructed by pressing the third switch, and the rotated perspective view of the three-dimensional object is displayed by releasing the third switch.

23. An apparatus as claimed in claim 21, wherein a parallel movement of the perspective view of the three-dimensional object is instructed by pressing the second switch, and the moved perspective view of the three-dimensional object is displayed by releasing the second switch.

* * * * *

UNITED STATES PATENT AND TRADEMARK OFFICE
CERTIFICATE OF CORRECTION

PATENT NO. : 5,422,987
DATED : June 6, 1995
INVENTOR(S) : Yoichi YAMADA

It is certified that error appears in the above-indentified patent and that said Letters Patent is hereby corrected as shown below:

Column 6, line 60, "13 and" should be --13--.

Column 15, line 23, "perspective" should be --the perspective--.

Column 17, line 10, "6" should be --21--.

Signed and Sealed this

Twelfth Day of December, 1995

Attest:

BRUCE LEHMAN

Attesting Officer

Commissioner of Patents and Trademarks